(12) United States Patent
Coudreuse

(10) Patent No.: US 6,724,726 B1
(45) Date of Patent: Apr. 20, 2004

(54) METHOD OF PUTTING A FLOW OF PACKETS OF A NETWORK FOR TRANSPORTING PACKETS OF VARIABLE LENGTH INTO CONFORMITY WITH A TRAFFIC CONTRACT

(75) Inventor: Jean-Pierre Coudreuse, Rennes (FR)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 646 days.

(21) Appl. No.: 09/694,322

(22) Filed: Oct. 24, 2000

(30) Foreign Application Priority Data

Oct. 26, 1999 (FR) ............................................ 99 13488

(51) Int. Cl.$^7$ .................................................. H04J 3/14
(52) U.S. Cl. ........................ 370/235; 370/229; 370/230
(58) Field of Search ................................. 370/229–230, 370/232, 233, 235, 252, 253, 395.4

(56) References Cited

U.S. PATENT DOCUMENTS

| | | | |
|---|---|---|---|
| 5,668,797 A | | 9/1997 | Fahmi et al. ................ 370/229 |
| 6,072,776 A | * | 6/2000 | Takamichi ................ 370/241.1 |
| 6,108,303 A | * | 8/2000 | Fahmi et al. ................ 370/230 |
| 6,172,979 B1 | * | 1/2001 | Kozakai ................... 370/230.1 |

FOREIGN PATENT DOCUMENTS

EP       0 817 433       1/1998

\* cited by examiner

*Primary Examiner*—Hassan Kizou
*Assistant Examiner*—Saba Tsejaye
(74) *Attorney, Agent, or Firm*—Oblon, Spivak, McClelland, Maier & Neustadt, P.C.

(57) ABSTRACT

The present invention concerns a method of putting a flow of packets of a network for transporting packets of variable length into conformity with a traffic contract. The method is of the type which consists, at each arrival of a packet, of comparing the time of this arrival with a theoretical arrival time and, if this arrival time is earlier than the theoretical time arrival time and, if this arrival time is earlier than the theoretical time by more than the jitter tolerance defined in the contract, destroying the packet or not further processing the packet, otherwise retransmitting the packet and then determining the theoretical arrival time for the next packet. According to the invention, it is characterized in that, in order to determine the theoretical arrival time for the next packet, it consists of adding a time ti related to the present packet i and which is a function $f$ of the theoretical arrival time TATi and if the actual arrival time θi of the packet i to an interpacket time Ti which is a function g of the negotiated time per unit length T defined in the traffic contract and of the length λi of the current packet i.

10 Claims, 2 Drawing Sheets

Figure 1:
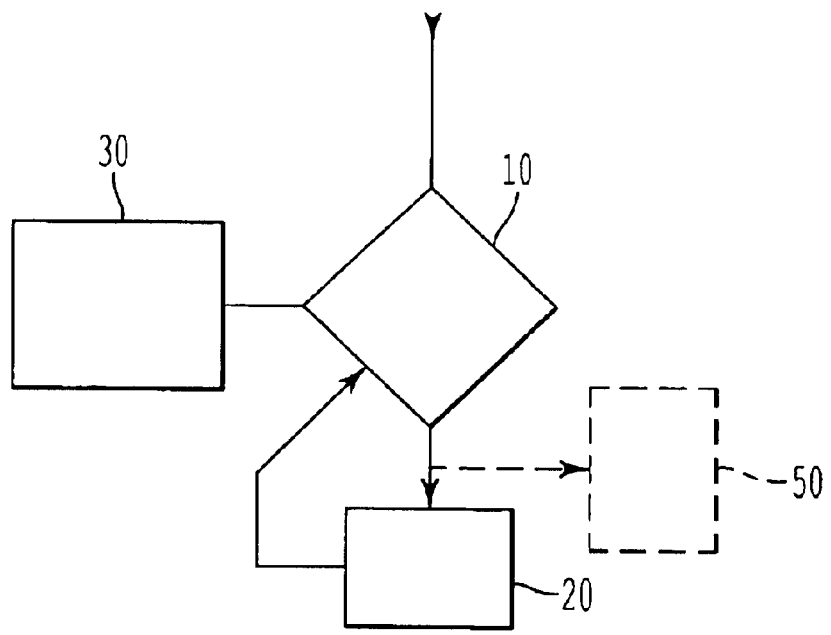

METHOD OF PUTTING A FLOW OF PACKETS OF A NETWORK FOR TRANSPORTING PACKETS OF VARIABLE LENGTH INTO CONFORMITY WITH A TRAFFIC CONTRACT

The present invention concerns a method of putting a flow of packets of a network for transporting packets of variable length into conformity with a traffic contract. Such a method is used in such a network for controlling compliance with traffic contracts reached between the users and the network and thus providing these same users with a performance guarantee.

Such methods of putting packet traffic back into conformity are already known, but for networks for transporting packets of fixed length, such as the cells in the ATM (Asynchronous Transfer Mode) networks.

The specific characteristics of the ATM networks which have made it possible to solve the various problems related to the performance guarantee are as follows.

ATM networks transport cells which are of fixed length which makes it possible to predict the mutual impact of the communications established and therefore allows controllable multiplexing schemes to be put in place. The traffic contract which is negotiated at the time the communication is established defines at least two parameters which are respectively the minimum time between two cell transmissions T (which is the inverse of the peak rate also referred to as "Peak Cell Rate" or "PCR") and the propagation time jitter tolerance $\tau$ (also referred to as "Cell Delay Variation" or "CDV") which can alter the intercell time. This tolerance $\tau$ covers the propagation time variations due to the multiplexing of cells. In more developed traffic contracts, it also accounts for the irregularities due to a source transmitting cells in unpredictable bursts.

ATM networks are generally provided with means for implementing a method of putting a flow of cells into conformity with the traffic contract mentioned previously as well as a method of reformatting the individual flows of cells restoring the original characteristics of the flow perturbed cumulatively by the jitter so as to put them back into conformity with the traffic contract or simply reduce the jitter in order to provide a better fluidity of the network.

For example, according to a known method of putting a flow of cells into conformity, the actual arrival time of a cell is compared with its Theoretical Arrival Time, hereinafter denoted TAT. If it is less than this theoretical arrival time by an amount greater than the jitter tolerance $\tau$, the cell is deemed to be too early and is then destroyed. Otherwise, it is transmitted and the theoretical arrival time for the next cell is updated by adding, either to the actual arrival time or to the theoretical arrival time, according to the greater of these two times, the minimum time between two cell transmissions.

It should also be noted that, according to this method, if a cell arrives earlier than its theoretical arrival time, it is the theoretical arrival time which is used for the updating. If it arrives later than its theoretical arrival time, it is its actual arrival time which is used for the updating. This implementation avoids the phenomenon of silence followed by a burst.

As for a known method of reformatting the individual flows of cells, this can be implemented in a spacing controller which no longer works on the arrival times of the cells, but on the retransmission times of the said cells.

The method described above, which establishes a virtual schedule of the theoretical arrival times of the cells and verifies at the time of the arrival of a cell that its theoretical arrival time conforms, is effective only because it is used in networks transporting packets which are of fixed length, such as the cells of ATM networks, with the result that the useful time consumed by the sending of each cell of any queue in the said network is fixed and can be determined.

However, this fixed size can prove highly constraining from the point of view of certain applications, and in particular applications which are low-speed but with a considerable real-time constraint, such as voice communication services. For example, this has led to specifying, in connection with and supplementary to the ATM standard, a superposed switching and multiplexing mode (AAL2) inserting, inside the cells of an ATM logical channel ("virtual channel" or VC), "mini-cells" of variable length limited to 48 (or 64) octets (generally to 48).

There is therefore a requirement for a method of putting a flow of packets into conformity with a traffic contract which is applicable to a network for transporting mini-cells and, more generally, packets of variable length. Such a method will provide a solution to the performance guarantee problem in such a network by allowing control of the traffic at the access and management of the flows.

The aim of the present invention is therefore to meet this requirement and propose a method of putting a flow of packets into conformity with a traffic contract which is applicable to a network for transporting packets of variable length.

To that end, a method of putting into conformity with a traffic contract according to the present invention consists, at each arrival of a packet, of comparing the time of this arrival with a theoretical arrival time and, if this arrival time is earlier than the said theoretical time by more than the jitter tolerance $\tau$ defined in the said traffic contract, destroying the said packet or not taking it into account, otherwise retransmitting the said packet and then determining the theoretical arrival time for the next packet. This method is characterised in that, in order to determine the said theoretical arrival time for the next packet, it consists of adding, on the one hand, a time $t_i$ related to the present packet i and which is a function $f$ of the theoretical arrival time $TAT_i$ and of the actual arrival time $\theta_i$ of the said packet i to, on the other hand, an interpacket time $T_i$ which is a function g of the negotiated time per unit length T defined in the said traffic contract and of the length $\lambda_i$ of the current packet i:

$$TAT_{i+1}=t_i+T_i=f(TAT_i, \theta_i)+g(T, \lambda_i)$$

Advantageously, the said interpacket time $T_i$ is equal to the product of the negotiated time per unit length T and the length $\lambda_i$ of the current packet i expressed in this same unit of length:

$$T_i=g(T, \lambda_i)=T\cdot\lambda_i$$

As for the time related to the present packet $t_i$, this is advantageously equal to the greater of the two times, the actual arrival time $\theta_i$ of the current packet i, on the one hand, and the theoretical arrival time $TAT_i$ of the current packet i, on the other hand:

$$t_i=f(TAT_i, \theta_i)=\max(TAT_i, \theta_i)$$

Advantageously, $t_i$ is equal to $\theta_i$ for the first packet.

The present invention also concerns a method of putting a flow of packets of a network for transporting packets of variable length into conformity with a traffic contract, of the type which consists, at each arrival of a packet, of determining the theoretical arrival time of the present packet, of comparing the actual time of this arrival with the said theoretical arrival time and, if this arrival time is earlier than the said theoretical time by more than the jitter tolerance, destroying the said packet or not taking it into account, otherwise retransmitting the said packet. It consists, in this case, in order to determine the said theoretical arrival time for the present packet, of adding, on the one hand, a time $t_{i-1}$ related to the previous conforming packet i-1 and which is a function $f$ of the theoretical arrival time $TAT_{i-1}$ and of the actual arrival time $\theta_{i-1}$ of the said packet i-1 to, on the other hand, an interpacket time $T_i$ which is a function g of the negotiated time per unit length T defined in the said traffic contract and of the length $\lambda_i$ of the current packet i:

$$TAT_i = t_{i-1} + T_i = f(TAT_{i-1}, \theta_{i-1}) + g(T, \lambda_i)$$

Advantageously, the said interpacket time $T_i$ is equal to the product of the negotiated time per unit length T and the length $\lambda_i$ of the current packet i expressed in this same unit:

$$T_i = g(T, \lambda_i) = T \cdot \lambda_i$$

As for the time related to the previous conforming packet i-1, this is advantageously equal to the greater of the two times: the actual arrival time $\theta_{i-1}$ of the said previous packet and its theoretical arrival time $TAT_{i-1}$:

$$t_{i-1} = f(TAT_{i-1}, \theta_{i-1}) = \max(TAT_{i-1}, \theta_{i-1})$$

Advantageously, $t_i$ is equal to $\theta_i$ for the first packet.

According to the two methods of the present invention described above, a packet which is deemed conforming is retransmitted at its actual arrival time $\theta_i$.

According to a variant of these two methods, a packet deemed conforming but arriving at a time $\theta_i$ earlier than its theoretical arrival time $TAT_i$ is retransmitted at the expiry of the theoretical arrival time related to the said packet, then denoted $TRT_i$.

Figure 3:
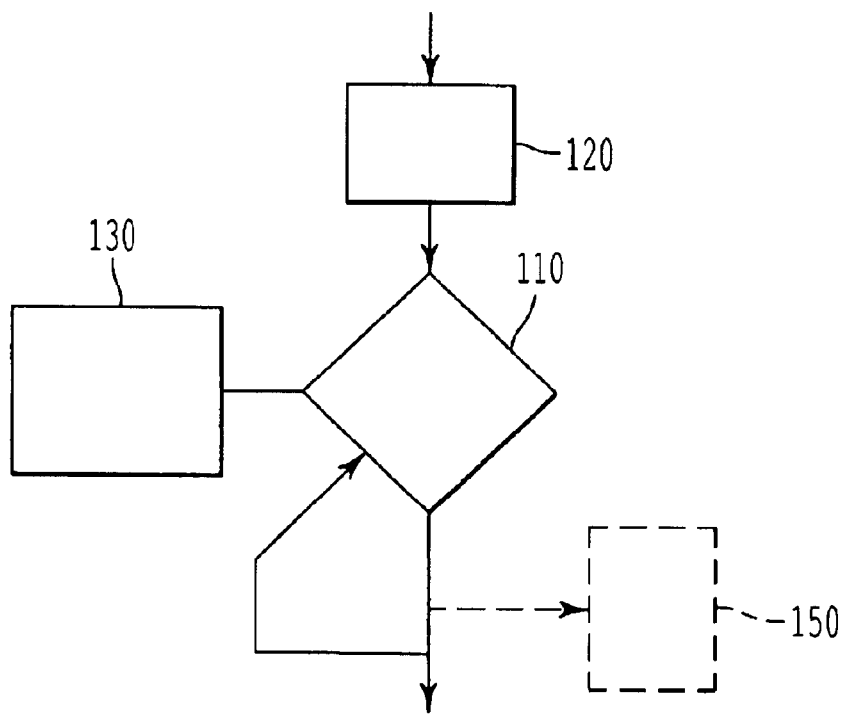
Figure 2:
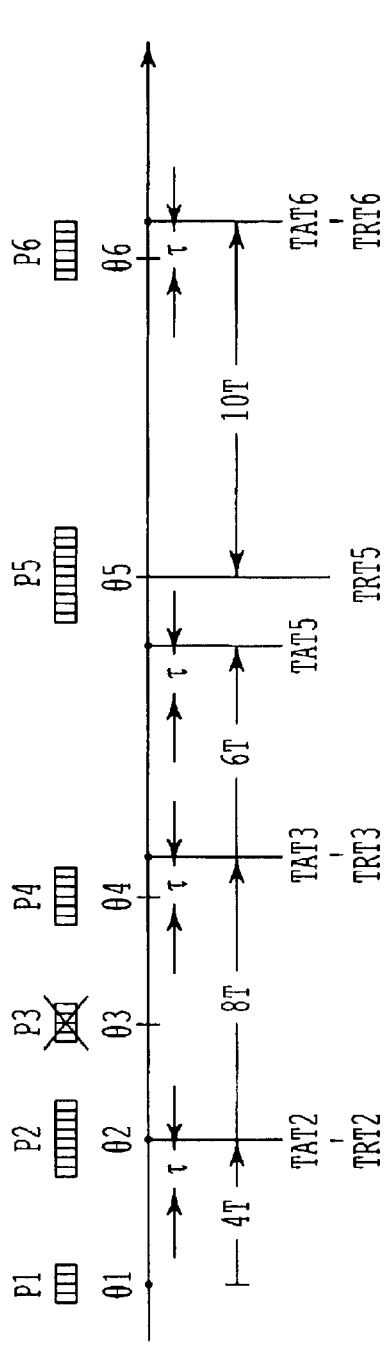
Figure 4:
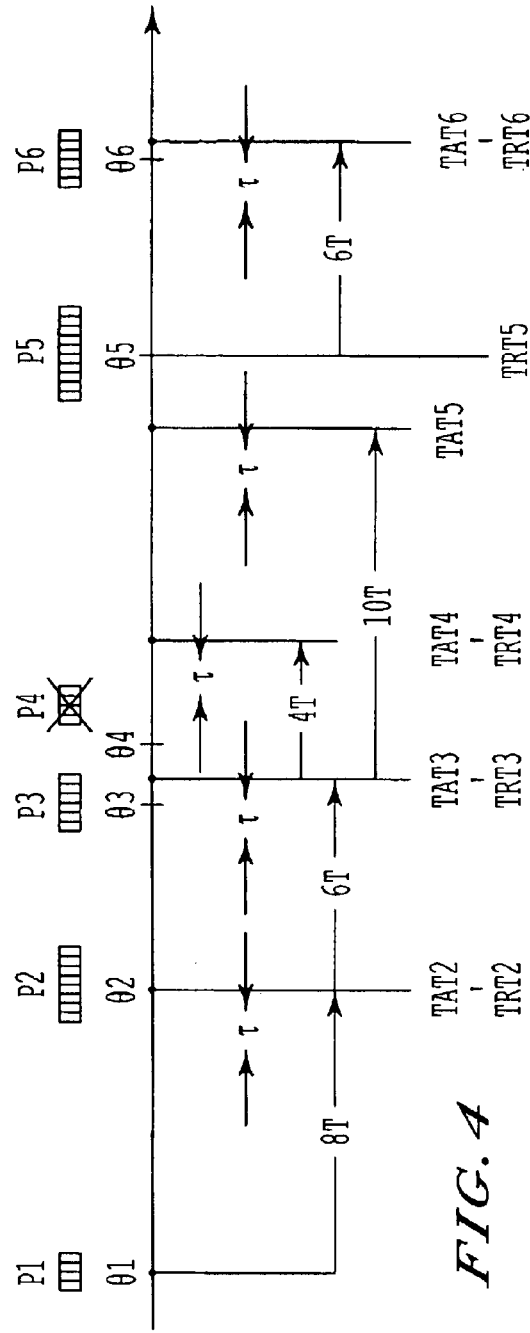

The characteristics of the invention mentioned above, as well as others, will emerge more clearly from a reading of the following description of example embodiments, the said description being given in relation to the accompanying drawings, among which:

FIG. 1 is a diagram showing the different steps of a method according to a first embodiment of the present invention, FIG. 2 is a timing diagram showing the processing of six packets by a method according to a first embodiment of the present invention, FIG. 3 is a diagram showing the different steps of a method according to a second embodiment of the present invention, FIG. 4 is a timing diagram showing the processing of six packets by a method according to a second embodiment of the present invention.

The present invention concerns a method of putting a flow of packets of a network for transporting packets of variable length into conformity with a traffic contract. The traffic contract which is negotiated at the time of the establishment of the communication defines two parameters which are respectively a negotiated time per unit length T (which is for example the inverse of the peak octet rate of the application, the unit of length then being the octet) and the propagation time jitter tolerance $\tau$ which can alter the interpacket time.

The jitter tolerance $\tau$ covers the variability in propagation time of packets in a network with queues. According to the method of the present invention, the variability in the length of packets generated by the source is known explicitly and taken into account during calculation of the virtual schedule. The necessity of a burst tolerance when it is introduced in ATM for accounting for the behaviour of a source which segments data packets into cells is therefore removed.

As can be seen in FIG. 1, at the arrival of a packet i, its arrival time $\theta_i$ is compared, at a step 10, with a theoretical arrival time $TAT_i$ which was previously determined at a step 20. If this actual arrival time $\theta_i$ is less than the theoretical arrival time $TAT_i$ by an amount greater than the jitter tolerance $\tau$, that is to say, if the following relationship is verified:

$$\theta_i < TAT_i - \tau$$

Then the packet i is deemed as having arrived too early and is destroyed in a step 30. Otherwise, it is retransmitted immediately.

The theoretical arrival time $TAT_{i+1}$, for the next packet i+1 is updated at the step 20. It is the calculation of the theoretical arrival time $TAT_{i+1}$, of the next packet or $TAT_i$ of the current packet which is characteristic of the present invention.

According to a first embodiment, the theoretical arrival time $TAT_{i+1}$ of the following packet i+1 is equal to a time $t_i$ related to the current packet i and which is a function $f$ of the theoretical arrival time $TAT_i$ of the current packet i and of its actual arrival time $\theta_i$, to which there is added an interpacket time $T_i$ which is a function g of the negotiated time per unit length T defined in the traffic contract and of the length $\lambda_i$ of the current packet i, with the result that the following can be written:

$$TAT_{i+1} = t_i + T_i = f(TAT_i, \theta_i) + g(T, \lambda_i)$$

For example, the time $t_i = f(TAT_i, \theta_i)$ is equal to the greater of the two times, the arrival time $\theta_i$ of the current packet i, on the one hand, and the theoretical arrival time $TAT_i$ of the current packet i, on the other hand. This then gives:

$$t_i = f(TAT_i, \theta_i) = \max(TAT_i, \theta_i)$$

Moreover, the interpacket time $T_i$ is for example equal to the product of the negotiated time per unit length T defined in the traffic contract and the length $\lambda_i$, of the current packet i expressed in this same unit of length. This then gives:

$$T_i = g(T, \lambda_i) = T \cdot \lambda_i$$

In these two cases combined, the following can therefore be written:

$$TAT_{i+1} = \max(TAT_i, \theta_i) + T \cdot \lambda_i$$

$TAT_i$ is equal to $\theta_i$ at the arrival of the first packet.

It should be noted that the negotiated time T which is defined in the traffic contract corresponds to a minimum imaginary delay per unit length, for example the octet.

FIG. 2 depicts a timing diagram showing the implementation of the method which has just been described in the case of six packets $P_1$ to $P_6$ of lengths $\lambda_1$ to $\lambda_6$ respectively equal to 4, 8, 4, 6, 10 and 6 units.

The first packet $P_1$ arrives at the time $\theta_1$. It is retransmitted immediately and its arrival time $\theta_1$ serves as a reference for calculating the theoretical arrival time of the following packet (which amounts to writing that $TAT_1 = \theta_1$). Its length being 4, the theoretical arrival time of the next packet $P_2$ is then equal to:

$$TAT_2 = \theta_1 + 4T$$

The packet $P_2$ arrives at the time $\theta_2$ corresponding to its theoretical arrival time $TAT_2$. It is therefore retransmitted immediately. Its length being 8, the theoretical arrival time $TAT_3$ is then calculated:

$$TAT_3 = \theta_2 + 8T$$

The packet $P_3$ arrives at the time $\theta_3$ which is earlier than the theoretical arrival time $TAT_3$ from which the jitter tolerance $\tau$ is subtracted. It is therefore destroyed. $TAT_3$ remains the reference theoretical arrival time for the following packet, the packet $P_4$ in the example of FIG. 2.

The packet $P_4$ arrives at the time $\theta_4$ which is earlier than the theoretical arrival time $TAT_3$ but situated inside the time interval defined by the jitter tolerance $\tau$. It is therefore retransmitted straight away. Its length being 6, the theoretical arrival time $TAT_5$ of the next packet is calculated:

$$TAT_5 = \max(TAT_3, \theta_4) + 6T = TAT_3 + 6T$$

The packet $P_5$ arrives at the time $\theta_5$ which is later than the theoretical arrival time $TAT_5$. It is therefore retransmitted straight away. Its length being 10, the theoretical arrival time $TRT_6$ of the next packet is calculated:

$$TAT_6 = \max(TAT_5, \theta_5) + 10T = \theta_5 + 10T$$

The process continues with the arrival of the packet $P_6$.

FIG. 3 depicts another embodiment of the present invention.

According to this embodiment, at a step 120 implemented at the arrival time $\theta_i$ of a packet i, the theoretical arrival time $TAT_i$ of the current packet i is determined by adding, to a time $t_{i-1}$ related to the previous conforming packet i−1 and which is a function $f$ of the theoretical arrival time $TAT_{i-1}$ of the previous packet i−1 and of its actual arrival time $\theta_{i-1}$, an interpacket time $T_i$ which is a function g of the negotiated time per units length T defined in the said traffic contract and of the length $\lambda_i$ of the current packet i:
ti $TAT_i = t^{i-1} + T_i = f(TAT_{i-1}, \theta_{i-1}) + g(T, \lambda_i)$ Like the previous embodiment, the time $t_{i-1} = f(TAT_{i-1}, \theta_{i-1})$ is equal to the greater of the two times, the arrival time $\theta_{i-1}$ of the previous conforming packet i−1, on the one hand, and the theoretical arrival time $TAT_{i-1}$ of the previous conforming packet i−1, on the other hand. This then gives:

$$t_{i-1} = f(TAT_{i-1}, \theta_{i-1}) = \max(TAT_{i-1}, \theta_{i-1})$$

Also, the interpacket time $T_i$ is advantageously equal to the product of the negotiated time T and the length $\lambda_i$ of the current packet i expressed in the same unit:

$$T_i = g(T, \lambda_i) = T \cdot \lambda_i$$

The following can therefore be written:

$$TAT_i = \max(TAT_{i-1}, \theta_{i-1}) + T \cdot \lambda_i$$

At a step 110, the actual arrival time $\theta_i$ of the current packet i is compared with the theoretical arrival time $TAT_i$ which has just been calculated. If it is less than this theoretical time $TAT_i$ by more than the jitter tolerance $\tau$ the packet i is deemed nonconforming and is therefore destroyed at a step 130. Otherwise, it is retransmitted.

FIG. 4 depicts a timing diagram showing the implementation of the method which has just been described in the case of six packets $P_1$ to $P_6$ of lengths $\lambda_1$ to $\lambda_6$ respectively equal to 4, 8, 6, 4, 10 and 6 arbitrary units.

The first packet $P_1$ arrives at the time $\theta_1$ and is then retransmitted. The theoretical time $TAT_1$ is equal to this time $\theta_1$.

The packet $P_2$, of length 8, arrives at the time $\theta_2$ and its theoretical arrival time $TAT_2$ is determined as being equal to:

$$TAT_2 = TAT_1 + 8T$$

As may be noted in the diagram of FIG. 4, the time $TAT_2$ corresponds to the actual arrival time of the packet $P_2$. The packet $P_2$ is therefore retransmitted.

The packet $P_3$, of length 6, arrives at the time $\theta_3$. The theoretical arrival time $TAT_3$ is determined:

$$TAT_3 = \max(TAT_2, \theta_2) + 6T = TAT_2 30\ 6T$$

The actual arrival time $\theta_3$ of the packet $P_3$ is earlier than this theoretical time $TAT_3$ but is within the interval defined by the jitter tolerance $\tau$. The packet $P_3$ is therefore retransmitted.

The packet $P_4$, of length 4, arrives at the time $\theta_4$. The theoretical arrival time $TAT_4$ is determined:

$$TAT_4 = \max(TAT_3, \theta_3) + 4T = TAT_3 + 4T$$

The actual arrival time $\theta_4$ of the packet $P_4$ is earlier than this theoretical time $TAT_4$ from which the jitter tolerance $\tau$ has been subtracted. The packet $P_4$ which is therefore not conforming is destroyed.

The reference time for calculating the arrival time of the next packet therefore remains the time $t_3 = \max(TAT_3, \theta_3)$.

The packet $P_5$, of length 10, arrives at the time $\theta_5$. The theoretical arrival time $TAT_5$ is determined by the following equation:

$$TAT_5 = \max(TAT_3, \theta_3) + 10T = TAT_3 + 10T$$

The actual arrival time $\theta_5$ of the packet $P_5$ is later than this theoretical time $TAT_5$ with the result that the packet $P_5$ is retransmitted.

The process continues with the arrival of the packet $P_6$, of length 6, at the time $\theta_6$. The theoretical arrival time of this packet becomes equal to:

$$TAT_6 = \max(TAT_5, \theta_5) + 6T = \theta_5 + 6T$$

In the previous two embodiments, a packet i determined as being conforming by the corresponding comparison step 10 or 110 is retransmitted at its actual arrival time $\theta_i$.

It should be noted that, according to a variant of these two embodiments, a packet, instead of being retransmitted immediately after the comparison step 10 or 110 might be retransmitted (at the steps 50 or 150 respectively depicted in dotted lines in FIGS. 1 and 3) only at the theoretical arrival time $TAT_i$, if it is greater than the actual arrival time $\theta_i$. "Theoretical Retransmission Time" $TRT_i$ is then referred to.

Thus, for example, according to the first embodiment, at the step 10, the arrival time $\theta_i$ of the current packet i is compared with the theoretical arrival time $TAT_i$ previously determined at the step 20 of the previous packet deemed conforming. If it is earlier than the said theoretical time by more than the jitter tolerance $\tau$, the packet is deemed non-conforming and is destroyed at the step 30. Otherwise, the packet is deemed conforming and is retransmitted in a step 50 at the expiry of $TRT_i = f(TAT_i, \theta_i)$, for example equal to $\max(TAT_i, \theta_i)$.

The theoretical arrival time of the following packet is updated in the step 20:

$$TAT_{i+1} = f(TAT_i, \theta_i) + g(T, \lambda_i) = TRT_i + g(T, \lambda_i)$$

In this case, as can be seen in FIG. 2, the packets $P_2$ to $P_6$ are respectively retransmitted at the times $TRT_2$ to $TRT_6$ which are identical to the times $TAT_2$ to $TAT_6$ with the exception of $TRT_5$ which is equal to $\theta_5$.

According to the second embodiment, at the step 120 implemented at each arrival time $\theta_i$ of a cell i, the theoretical arrival time $TAT_i$ of the said packet is calculated according to the following equation:

$$TAT_i = \max(TAT_{i-1}, \theta_{i-1}) + g(T, \lambda_i)$$

The arrival time $\theta_i$ of the current packet i is next compared to the theoretical arrival time $TAT_i$ which has just been determined at the previous step 120. If it is less than this theoretical time $TAT_i$ by more than the jitter tolerance $\tau$, the packet is deemed non-conforming and is destroyed at the step 130. Otherwise, the packet is deemed conforming and is retransmitted in a step 150 at the expiry of $TRT_i = f(TAT_i, \theta_i)$, for example equal to $\max(TAT_i, \theta_i)$.

In this case, as can be seen in FIG. 4, the packets $P_2$ to $P_6$ are respectively retransmitted at the times $TRT_2$ to $TRT_6$ which are identical to the times $TAT_2$ to $TAT_6$ with the exception of $TRT_5$ which is equal to $\theta_5$.

A method according to the present invention can be implemented at a network access interface. It can also be implemented in switching mechanisms of the network which incorporate calculation of the theoretical retransmission times for rearranging the packets belonging to different logical channels at the time they are multiplexed, or even for retransmitting them at the calculated theoretical times.

It should be noted that the packets which are processed by a method according to the present invention can belong to a single logical channel but also to a number of logical channels.

The packets can be of variable length on a logical channel. The packet length information $\lambda_i$ required by the method of the invention for implementation is then generally carried by the packets themselves which, in order to do this, have for example a length indication field. It can be deduced from the method of delimiting the packets at the time they are received.

The packets can be of constant length on each logical channel, in the case of a number of logical channels. This length is for example negotiated at the time of establishment of the connection and is transmitted to the system implementing the method of the invention in the same way as the other control parameters, namely the negotiated time T and the jitter tolerance $\tau$.

A method according to the present invention allows better optimization of the resources inasmuch as it is the actual lengths of the packets which are taken into account in the admission and control mechanisms and not their permitted maximum values. The unknown factor introduced for example by the ATM burst tolerance ("Maximum burst size" represented by $\tau_{MBS}$) is therefore removed by the method.

It should be noted that, according to the last embodiment of the present invention which effectively spaces out the packets according to their theoretical arrival time, the theoretical retransmission time $TRT_i$ is determined additively from the theoretical retransmission time $TRT_{i-1}$ of the previous packet. This embodiment therefore preserves the order of the cells on the link.

The same applies for the other embodiments since the retransmission of a packet, if it takes place (if the packet is conforming), is concomitant with its arrival.

It has been possible to state that the use of the spacing function in the second embodiment of the present invention implicitly assigns a relative time priority to the short packets over the long packets issuing from different logical channels. This is due to the fact that each packet is delayed by a time proportional to its length: a long packet is subject to a greater effective delay than a short packet. Thus, the packets carrying voice information, a priori much shorter, will be attended to with priority over the longer data packets. The same would apply for the packets carrying service or control information which are generally very short and which would therefore be attended to with priority over those carrying user information.

What is claimed is:

1. Method of putting a flow of packets of a network for transporting packets of variable length into conformity with a traffic contract, the method consisting, at each arrival of a packet, of comparing the time of this arrival with a theoretical arrival time and, if this arrival time is earlier than the theoretical time by more than the jitter tolerance defined in the contract, destroying the packet or not further processing the packet, otherwise retransmitting the packet and then determining the theoretical arrival time for the next packet, characterised in that, in order to determine the theoretical arrival time for the next packet, it consists of adding a time $t_i$ related to the present packet i and which is a function $f$ of the theoretical arrival time $TAT_i$ and of the actual arrival time $\theta_i$ of the packet i to an interpacket time $T_i$ which is a function g of the negotiated time per unit length T defined in the traffic contract and of the length $\lambda_i$ of the current packet i:

$$TAT_{i+1} = t_i + T_i = f(TAT_i, \theta_i) + g(T, \lambda_i).$$

2. Method of putting into conformity according to claim 1, characterised in that the interpacket time $T_i$ is equal to the product of the negotiated time T defined in the traffic contract and the length $\lambda_i$ of the current packet i expressed in the same unit:

$$T_i = T \cdot \lambda_i.$$

3. Method of putting into conformity according to claim 1, characterised in that the time $t_i$ is equal to the greater of the two times, the arrival time $\theta_i$ of the current packet i, on the one hand, and the theoretical arrival time $TAT_i$ of the current packet i, on the other hand:

$$t_i = \max(\theta_i, TRT_i).$$

4. Method of putting into conformity according to claim 3, characterised in that the time $t_i$ is equal to the actual arrival time $\theta_i$ for the first packet.

5. Method of putting a flow of packets of a network for transporting packets of variable length into conformity with a traffic contract, the method consisting, at each arrival of a packet, of determining the theoretical arrival time of the present packet, of comparing the time of this arrival with the theoretical arrival time arid, if this arrival time is earlier than the theoretical time by the jitter tolerance $\tau$ defined in the traffic contract, destroying the packet or not further processing the packet, otherwise retransmitting the packet, characterised in that, in order to determine the theoretical arrival time for the present packet, it consists of adding, on the one hand, a time $t_{i-1}$ related to the previous conforming packet i–1 and which is a function $f$ of the theoretical arrival time $TAT_{i-1}$ and of the actual arrival time $\theta_{i-1}$ of the said packet i–1 to, on the other hand, an interpacket time $T_i$ which is a function g, on the one hand, of a negotiated time per unit length T defined in the traffic contract and, on the other hand, of the length $\lambda_i$ of the current packet i:

$$TAT_i = t_{i-1} + T_i = f(TAT_{i-1}, \theta_{i-1}) + g(T, \lambda_i).$$

6. Method of putting into conformity according to claim 5, characterised in that the interpacket time $T_i$ is equal to the product of the negotiated time T defined in the traffic contract and the length $\lambda_i$ of the current packet i expressed in the same unit:

$$T_i = T \cdot \lambda_i.$$

7. Method of putting into conformity according to claim 5, characterised in that the time $t_{i-1}$ which is related to the previous conforming packet i−1 and which is a function $f$ of its theoretical arrival time $TAT_{i-1}$ and of its actual arrival time $\theta_{i-1}$ is equal to the greater of the two times, the arrival time $\theta_{i-1}$ of the previous conforming packet i−1, on the one hand, and the theoretical arrival time $TAT_{i-1}$ of the previous conforming packet i−1, on the other hand:

$$t_{i-1} = \max(\theta_{i-1}, TAT_{i-1}).$$

8. Method of putting into conformity according to claim 7, characterised in that, for the first packet, it consists of making the theoretical arrival time $TAT_i$ of the current packet i equal to the actual arrival time $\theta_i$.

9. Method of putting into conformity according to one of the previous claims, characterised in that a packet deemed conforming is retransmitted at its actual arrival time $\theta_i$.

10. Method of putting into conformity according to one of claims 1 to 8, characterised in that a packet deemed conforming but arriving at a time $\theta_i$ earlier than its theoretical arrival time $TAT_i$ is retransmitted at the expiry of the theoretical time $TAT_i$ related to the packet.

* * * * *